3,187,185
APPARATUS FOR DETERMINING SURFACE CONTOUR
James A. Milnes, Pitcairn, Pa., assignor to United States Steel Corporation, a corporation of New Jersey
Filed Dec. 22, 1960, Ser. No. 77,780
4 Claims. (Cl. 250—222)

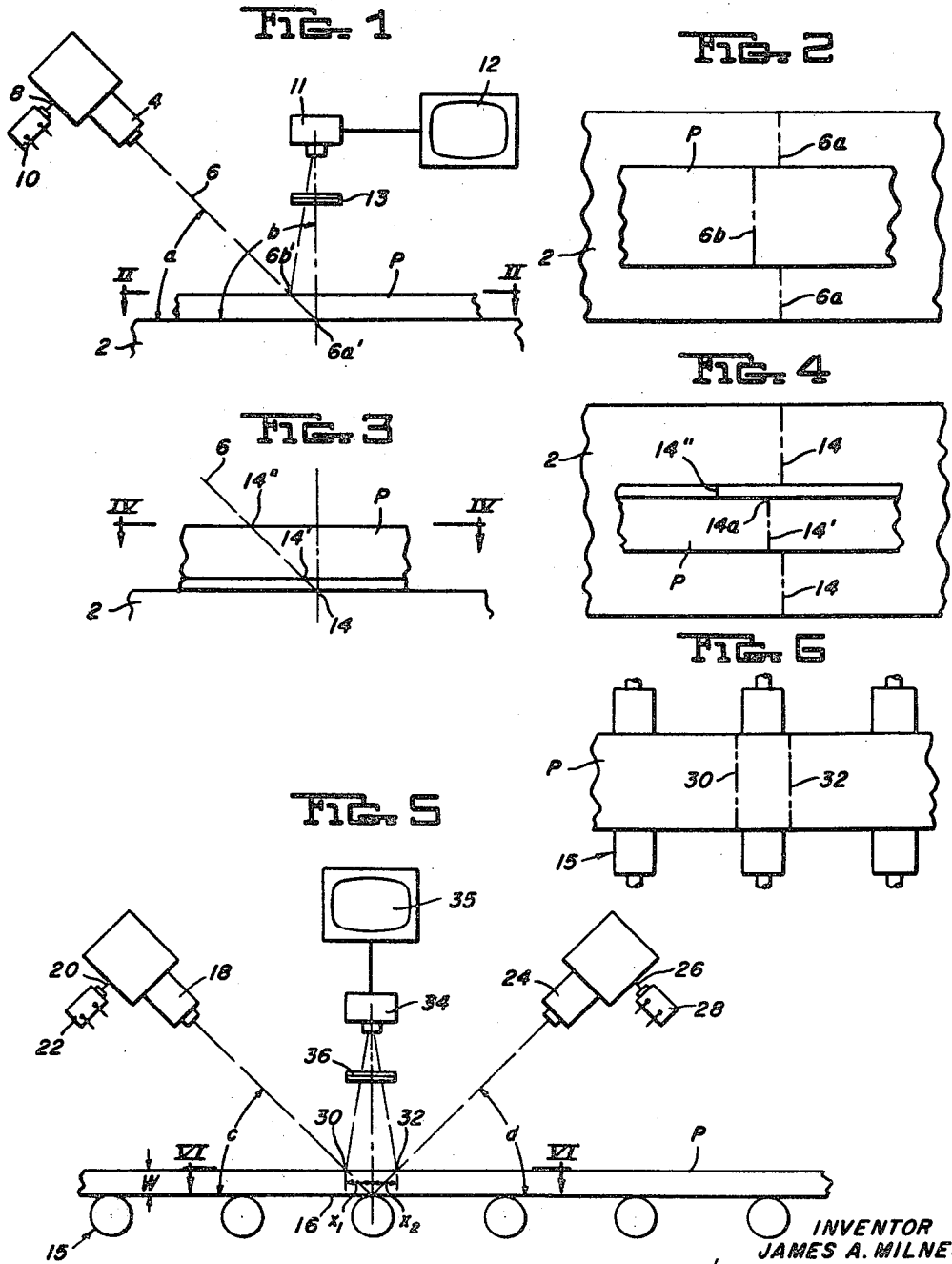

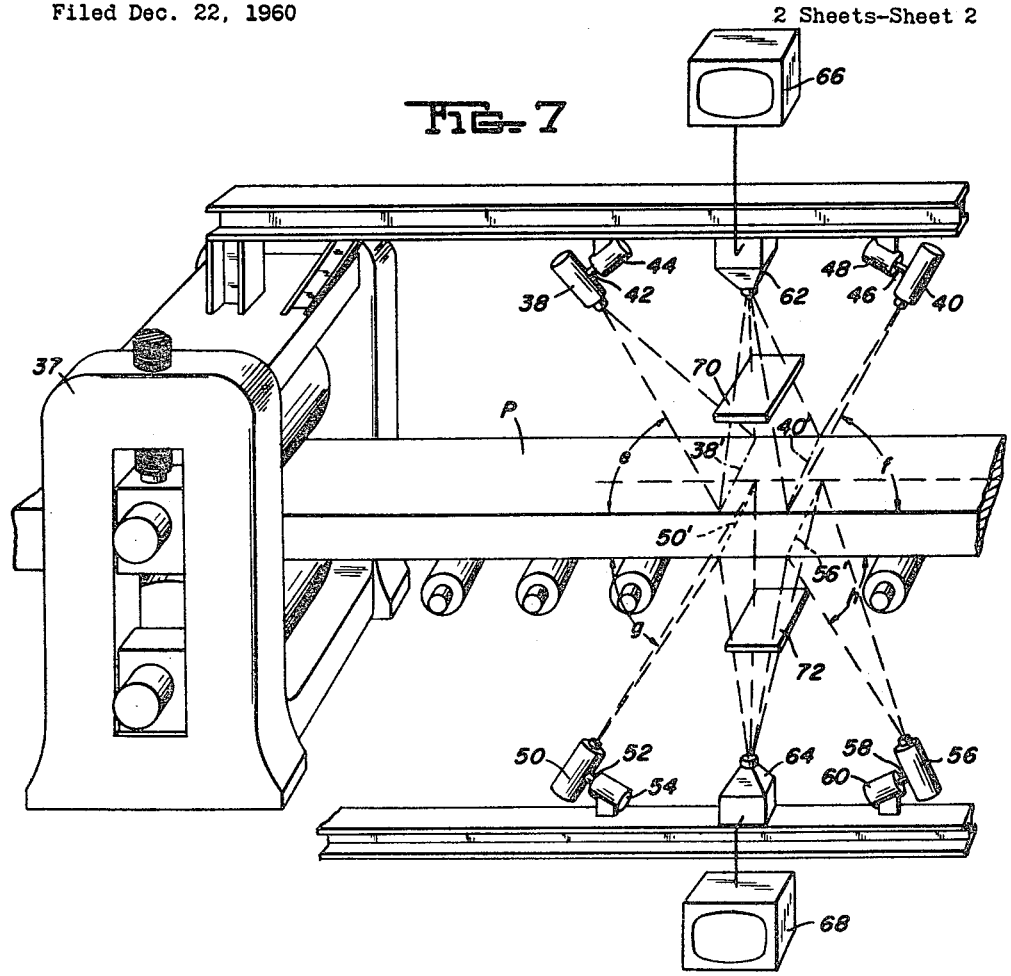
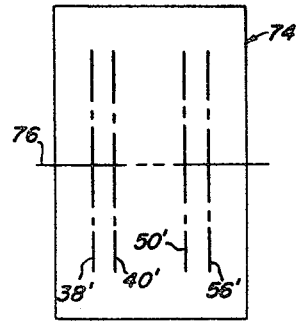
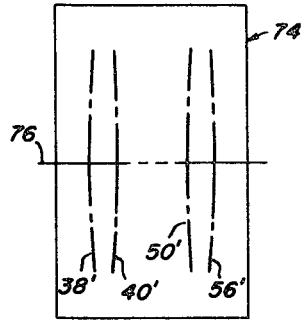
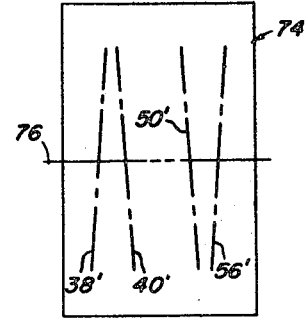

This invention relates to apparatus for determining the surface contour and/or thickness of an article without contacting the article. In certain processes, such as in steel rolling mills, where the rapid handling of articles precludes measuring the dimensions by conventional contact means, it is important to obtain rapid measurements by non-contacting means. Non-contact X-ray gages have been used, but they can only make a measurement between two points at a time. This is not satisfactory when the article tapers as it often does in a rolling mill.

Therefore, it is an object of my invention to provide apparatus for determining the dimensions and surface contour of an article without contacting the article.

Another object is to provide apparatus which will reproduce the contour of the surface of an article without contacting the article.

These and other objects will be more apparent after referring to the following specification and attached drawings in which:

FIGURE 1 is a schematic view of one embodiment of my invention;

FIGURE 2 is a view taken on line II—II of FIGURE 1;

FIGURE 3 is a view of an angle being measured by the apparatus of FIGURE 1;

FIGURE 4 is a view taken on line IV—IV of FIGURE 3;

FIGURE 5 is a schematic view of a second embodiment of my invention;

FIGURE 6 is a view taken on line VI—VI of FIGURE 5;

FIGURE 7 is a schematic view of a third embodiment of my invention;

FIGURE 8 is a composite view of the beam images on the upper and lower surfaces of a rectangular billet;

FIGURE 9 is a view similar to FIGURE 8, except that the billet is crowned; and

FIGURE 10 is a view similar to FIGURE 8, except that the billet is tilted.

Referring more particularly to the drawings, reference numeral 2 indicates a table on which a workpiece P is supported for measurement. The workpiece shown in FIGURES 1 and 2 is a steel bar of rectangular cross-section but the dimensions of any material of any shape may be measured by the use of my invention. A light beam source 4 is so positioned above table 2 that a beam of light 6 strikes table 2 and the surface of workpiece P at an angle "$a$." The beam source 4 is attached to shaft 8 of a motor 10. A camera 11 is located above the table 2 and is positioned so that the line from the camera to the point of impingement of beam 6 on table 2 is at an angle "$b$" with respect to the surface of table 2. A television camera tube may be substituted for the camera 11 in which case a receiver 12 is connected to camera 11. The receiver 12 preferably has a long persistence kinescope tube. In place of the camera, special photo-electric devices could be used to provide automatic evaluation of trace spacing without providing a visual record. The color of the beam of light 6 is selected so that it contrasts with the color of the workpiece P. For example, if the workpiece P is red-hot steel, a blue or ultraviolet beam is preferred. The color of the surface of the table 2 is selected to contrast with the color of the beam 6. A filter 13 of an appropriate color is interposed between workpiece P and camera 11 to enhance the visibility of the image of beam 6.

The operation of this embodiment of my invention is as follows: With the workpiece P resting against table 2, motor 10 is energized so that a plane of light is produced, thereby forming a line of light across the table 2 and workpiece P for each revolution of the beam source 4. If the shutter of the camera 11 is opened during the time the beam 6 traverses table 2, a photograph, of which FIGURE 2 is a replica, will be produced in which the line $6a$, on the table 2, may be considered a reference beam and the line $6b$, on workpiece P, a measuring beam. The distance on the photograph between the lines $6a$ and $6b$ will be proportional to the actual distance on the workpiece between the lines $6a'$ and $6b'$ which, in turn, is proportional to the thickness of the workpiece. It is convenient to set angle "$a$" at 45° and angle "$b$" at 90° so that the distance between the lines $6a'$ and $6b'$ is equal to the thickness of the workpiece P. If the amount of reduction produced by the camera is known, the thickness workpiece P is readily obtainable from the photograph. If many measurements are to be made at the same settings of angles "$a$" and "$b$," a graduated template may be made which can be placed over the photograph to obtain the thickness directly.

The dimensions of other shapes may be determined in a like manner. For example, an angle P′ is shown in place on table 2 in FIGURE 3 with FIGURE 4 showing a replica of a photograph of the light beam 6 on the angle. The web thickness of the angle is proportional to the distance between the lines 14 and 14′ and the total thickness or height of the vertical leg of the angle is proportional to the distance between the lines 14 and 14″. The width of the web is proportional to the length of the line 14′ and the thickness of the vertical leg is proportional to the width of the line 14″. The shape of the filet may be observed from the curvature of the beam $14a$.

It is seen that the object, the dimensions of which are to be measured, must rest upon the table 2 because all measurements are made with respect to the image of the beam 6 on table 2. In practice this is often difficult; for example, in the case where the workpiece is being conveyed along a series of rollers. The embodiment shown in FIGURE 5 provides for this situation. A workpiece P is conveyed along a conventional roller conveyor 15. The tops of the rollers 15 describe a theroetical plane 16. A beam source 18 is positioned at an angle "$c$" with respect to the plane 16 and is attached to a shaft 20 of a motor 22. A beam source 24 is positioned at an angle "$d$" with respect to the plane 16 and is attached to shaft 26 of a motor 28. The motors 22 and 28 are preferably synchronized with one another. Beam sources 18 and 24 make lines 30 and 32, respectively on the workpiece P. The beam sources 18 and 24 are so positioned that their beams will intersect each other in any known plane but preferably in the plane 16. A camera 34 is positioned above the point of intersection of the beams 18 and 24. The camera 34 may be a television camera in which case a receiver 35 having a long persistence kinescope tube is connected to camera 34. If a colored beam of light is required due to the color of the workpiece P, a filter 36 of the appropriate color may be provided between workpiece P and camera 34.

The operation of this embodiment of my invention is as follows:

When the motors 22 and 28 are energized, two planes of light are produced which intersect the workpiece P and create two lines of light thereon. It is desirable to have the speed of travel of these beams fast with respect to the speed of travel of workpiece P along the conveyor 15. When the shutter of the camera 34 is opened during the time that the beams sweep across the workpiece P, two lines 30 and 32 are photographed as shown in FIGURE 6. One of these lines may be thought of as a reference beam and the other a measuring beam because the distance between them is proportional to the thickness of workpiece P. It is preferable that the shafts 20 and 26 be in the same plane so that the lines 30 and 32 will be parallel if the top surface of workpiece P is horizontal. That the distance between the lines 30 and 32 is proportional to the thickness of the workpiece P may be seen from a consideration of FIGURE 5. The distance between the lines 30 and 32 is broken into two components, $X_1$ and $X_2$, so that:

$$30-32 = X_1 + X_2$$

If W is the thickness of the workpiece P;

$$W = X_1 \tan c = X_2 \tan d$$

Since the angles $c$ and $d$ remain constant, $X_1 + X_2$ is proportional to W. The measurement is simplified if the angles $c$ and $d$ are properly chosen. If $c = d = \text{arc tan } 2$, then $W = X_1 + X_2$ which is the same as the distance between the lines 30 and 32. When the amount of reduction caused by the camera is known, the thickness W may be determined from the distance between the lines 30 and 32 on the photograph. Although I have shown a rectangular workpiece, it is obvious that the dimensions and contour of a workpiece of any shape may be determined.

The embodiment just described requires that the position of the workpiece P with respect to the plane 16 be known for accurate measurements. Often a workpiece will bounce at it progresses down the conveyor so that its position with respect to a fixed plane is unknown. The embodiment shown in FIGURE 7 is arranged to accommodate this situation. A workpiece P is transported through a work stand 37 of a conventional rolling mill. Two beam sources 38 and 40 are mounted above the normal pass line of the mill. The beam source 38 is attached to shaft 42 of a motor 44 and the beam source 40 is attached to shaft 46 of a motor 48. The beams from sources 38 and 40 strike the top surface of the workpiece P at angles "e" and "f," respectively. A beam source 50 attached to shaft 52 of a motor 54 and a beam source 56 attached to shaft 58 of a motor 60 are mounted below the normal pass line of the mill. The beams from sources 50 and 56 strike the bottom surface of the workpiece at angles "g" and "h," respectively. The motors 44, 48, 54, and 60 are preferably synchronized with one another. The shafts 42, 46, 52, and 58 are preferably in the same vertical plane so that the images of the beams on the workpiece P will be parallel if the top and bottom surfaces of the workpiece are horizontal. A camera 62 is located above the normal pass line between the beam sources 38 and 40 and a camera 64 is located below the normal pass line between the beam sources 50 and 56. The cameras 62 and 64 may be television cameras in which case receivers 66 and 68, respectively, are connected to them. Should color beams be needed a filter 70 is placed between workpiece P and the camera 62 and a filter 72 between workpiece P and the camera 64.

The operation of this embodiment of my invention is as follows:

The motors 44, 48, 54 and 60 are energized so that the beam sources 38, 40, 50, and 56 sweep lines of light 38', 40', 50', and 56', respectively, across the top and bottom surfaces of the workpiece P. The shutters of the cameras 62 and 64 are opened during the time the beams are swept across the workpiece and two photographs are obtained, each photograph having a measuring beam and a reference beam. If the angles "e," "f," "g," and "h" are each chosen as arc tan 2 the sum of the distances between the images of the beams on the top surface and the distance between the beams on the bottom surface will be equal to the thickness of the workpiece P. The thickness may be readily determined from the photographs if the amount of reduction caused by the cameras 62 and 64 is known. If the top and bottom edges of the workpiece P are horizontal the photographs will appear as in FIGURE 8 and the thickness of the workpiece proportional to the sum of the distances between the lines in each pair of lines. If the workpiece is crowned, this is, thicker in the center than on each edge, the photographs will appear as in FIGURE 9. If the workpiece P is not lying flat with respect to the pass line but has parallel top and bottom surfaces, the photographs will appear as in FIGURE 10. Thus it is seen that any contour will be readily apparent by looking at the photographs. Furthermore, since the camera or other detecting device is located at a fixed point in space, the location of the image of the trace with respect to the detecting surface will be representative of physical displacement of the scanned object. Thus, width and position of the object can be measured, as well as contour. In FIGURES 7, 8 and 9, line 74 represents the boundary of the film or other detecting surface, and the dashed line 76 represents a nominal centerline associated with the geometry of the apparatus and the detector location. Thus, when the lines 38', 40', 50', and 56' are symmetrical with respect to line 76, the workpiece P is centered in the rolling mill. Also, the lengths of lines 38' and 40' represent the width of the top surface of the workpiece, and the lengths of lines 50' and 56' represent the width of the bottom surface of the workpiece.

In each of the embodiments described above the planes of light directed on the article may be produced by a stationary elongated light source rather than by rotating a light source as described.

While several embodiments of my invention have been shown and described it will be apparent that other adaptations and modifications may be made without departing from the scope of the following claims.

I claim:

1. Apparatus for measuring the thickness of an article comprising a table for supporting said article, a first means for producing a beam of energy, a second means for producing a beam of energy, both of said beam producing means being situated on the side of the article opposite the table, means for rotating said first beam producing means on an axis at a fixed oblique angle with the plane of the table surface, means for rotating said second beam producing means on an axis at a fixed oblique angle with the plane of the table surface, said axes being in the same plane, said beam producing means being so positioned that their respective beams will intersect at a line the location of which with respect to said table is known, and means for measuring the distance between the images of the beams on the article while maintaining the angles of impingement of said beams fixed with respect to said table, said measuring means including means for photographing the images formed by the said beam producing means, and means for measuring the distance between the lines on the photograph, said last named means being calibrated to compensate for the difference in the true distance between said images and the distance between the lines on the photograph.

2. Apparatus for measuring the thickness of an article comprising a first means for producing a beam of energy, a second means for producing a beam of energy, a third means for producing a beam of energy, a fourth means for producing a beam of energy, said first and second beam producing means being situated on one side of the article and said third and fourth beam producing means being situated on the other side of the article, means for rotating each of said beam producing means about axes which are at fixed oblique angles with the face of the article, the axis on which said first beam producing means rotates being so positioned that the beam will strike said fourth beam producing means at some point in the rotation of said first beam producing means, the axis on which said second beam producing means rotates being so positioned that the beam will strike said third beam producing means at some point in the rotation of said second beam producing means at some point in the rotation of said second beam producing means, the axis on which said fourth beam producing means rotates being so positioned that the beam will strike said first beam producing means at some point in the rotation of said fourth beam producing means, the axis on which said third beam producing means rotates being so positioned that the beam will strike said second beam producing means at some point in the rotation of said third beam producing means, means for measuring the distance between the images on the article formed by said first and second beam producing means while maintaining the angles of impingment of said beams fixed with respect to each other, and means for measuring the distance between the images on the article formed by said third and fourth beam producing means while maintaining the angles of impingement of said beams fixed with respect to each other.

3. Apparatus according to claim 2 in which the said beam producing means produces a beam in the ultraviolet range of the spectrum, and means for filtering out all frequencies of light other than the ultraviolet energy situated between the images and the said measuring means.

4. Apparatus according to claim 2 in which the measuring means include a first television camera and a receiver associated with said first camera, said receiver having a kinescope with a long persistence screen, a second television camera and a receiver associated with said second camera, said receiver having a kinescope with a long persistence screen, said first television camera being directed toward the images on the article produced by said first and second beam producing means, said second television camera being directed toward the images on the article produced by said third and fourth beam producing means, and means for measuring the distance between the lines on the receiver, said last named means being calibrated to compensate for the difference in the true distance between said images and the distance between the lines on the receiver.

References Cited by the Examiner
UNITED STATES PATENTS

| | | | |
|---|---|---|---|
| 2,079,900 | 5/37 | Cohn | 250—65 |
| 2,281,931 | 5/42 | Frank | 250—65 X |
| 2,315,282 | 3/43 | Snow | 250—222 X |
| 2,379,263 | 6/45 | Vine | 88—14 |
| 2,396,069 | 3/46 | Zapp | 250—53 |
| 2,429,066 | 10/47 | Kuchni | 88—14 |
| 2,446,628 | 8/48 | Brown | 88—14 |
| 2,521,953 | 9/50 | Tuttle | 250—52 |
| 2,524,839 | 10/50 | Schulman et al. | 250—52 |
| 2,524,929 | 10/50 | Razek | 250—223 X |
| 2,604,809 | 7/52 | Mitchell | 250—222 X |
| 2,607,267 | 8/52 | Fultz et al. | 88—14 |
| 2,753,464 | 7/56 | Stone | 250—219 |
| 2,812,440 | 11/57 | Hartman et al. | 250—65 |
| 2,866,376 | 12/58 | Cook | 250—219 |
| 2,867,149 | 1/59 | Goddard | 88—14 |
| 2,870,336 | 1/59 | Fountain et al. | 250—53 |
| 2,954,721 | 10/60 | Voelker | 88—14 |
| 2,975,285 | 3/61 | Palmer | 250—83.3 |
| 2,982,814 | 5/61 | Fine | 250—53 |
| 2,998,745 | 9/61 | McClellan | 88—14 |
| 3,016,464 | 1/62 | Bailey | 250—224 X |
| 3,091,699 | 3/63 | Hammar | 250—236 X |

RALPH G. NILSON, *Primary Examiner.*
ARTHUR GAUSS, *Examiner.*